3,282,704
METHOD OF PREPARING A POTATO PRODUCT UTILIZING TOASTED DEHYDRATED POTATOES AND PRODUCT
Edward L. Fritzberg, Minneapolis, Minn., assignor to The Pillsbury Company, Minneapolis, Minn., a corporation of Delaware
No Drawing. Filed Apr. 11, 1962, Ser. No. 186,655
10 Claims. (Cl. 99—100)

This invention relates generally to potato products produced from dehydrated potatoes. More particularly, it relates to improved "fabricated" French fries produced from dehydrated potatoes by techniques similar to those described in my co-pending application of common assignee Serial Number 94,684, which was filed on March 10, 1961, for "Snack Food Item and Process for Manufacture," now abandoned.

French fries produced in the conventional manner from raw potatoes are disadvantageous in several respects. First, the quality of French fries produced varies from species to species of potatoes. Moreover, even within one species the quality varies depending on age of potato. Secondly, the frying time required to produce a palatable French fry varies between species and also is a function of age. Thirdly, cut potato strips, from which French fries are made, necessarily vary in size because of the irregular shape of potatoes; therefore, a batch of cut strips does not fry uniformly.

To solve the inadequacies of French fries produced from regular potatoes, attempts have been made to produce "fabricated" French fries from an extruded dough. In this manner the composition of the French fry can be carefully controlled. The raw material can be made just prior to frying, thus eliminating the quality variation induced by time. Moreover, the size of the pieces can be carefully controlled to assure uniformity of frying.

Although palatable fabricated French fries have been produced by prior techniques, the quality attained has never equalled the quality of a high quality French fry produced in the normal manner from raw potatoes. Two problems have been encountered; namely, the flavor of a high quality natural French fry has never been duplicated, and, secondly, a dry, mealy, friable texture has never been achieved.

More specifically, it has been proposed that French fries be formed by extruding a dough made from dehydrated mashed potatoes, such as potato flakes of the type which are normally used to produce instant mashed potatoes. In the co-pending application mentioned above, it is disclosed that the cohesiveness necessary to produce an extrudable dough may be attained by physically rupturing a portion of the starch cells of the flakes contained in the dough. Although, by means of the process disclosed in that application, a palatable French fry, the quality of which may exceed the quality of French fries produced in the normal manner from many types of potatoes, may be made, there is much room for improvement as regards flavor and texture.

Accordingly, it is an object of the present invention to provide improved French fries formed from a dough and methods for the production thereof.

Another object of the invention is to provide fabricated French fries which equal in flavor and texture high quality French fries produced in the conventional manner from raw potatoes.

The provision of an improved high quality French fry produced from dehydrated mashed potatoes is a further object of the invention.

In the past, all prior French fries, including those produced by conventional means from raw potatoes, have manifested a tendency to become limp and soggy when cooled. Moreover, in the frozen French fry field where potatoes are pre-fried and frozen before distribution to the consumer who merely heats the frozen product in an oven, a product which is crisp after reheating has never been available.

Accordingly, it is another object of the invention to provide French fries which retain crispness upon cooling.

A further object is to provide a pre-fried frozen French fry which can be reheated in an oven to a crisp state.

Dehydrated potato flakes which are presently available break down readily upon mixing and release free starch which results in a pasty texture. When flakes are used in a dough from which an article of food is made, this characteristic is extremely disadvantageous because such doughs must be handled or worked during the forming process. For example, when a potato-flake dough must be mixed, extruded, cut and transported to a frying apparatus, as is necessary in the making of formed French fries, control of texture is extremely difficult.

It is accordingly, a still further objective of the invention to provide a dehydrated potato-flake dough which is less susceptible to starch cell breakdown during handling.

Other objects of the invention will be apparent from an examination of the following description of the invention and the claims appended thereto.

In accordance with the present invention the above objects are attained by providing a fabricated French fry in which at least a portion of the dehydrated potatoes used therein are "toasted." In French fries made according to the present invention a dry, mealy friable texture, which is fully equivalent to the texture of the best French fry made from raw potatoes, may be easily attained: sarch breakdown does not occur as readily during handling as in dough made with non-toasted flakes. Moreover, the flavor of fabricated French fries is materially enhanced when toasted dehydrated potatoes are used.

As will be more fully apparent from an examination of the examples below, the term "toasted," as applied to dehydrated mashed potatoes, means and is hereby expressly defined to mean the slightly browned product resulting from heat treating dehydrated potatoes at elevated temperatures. To produce the brown color, it is necessary that the water content of the dehydrated potatoes, which is normally 6 to 7 percent by weight, be reduced to less than 1 percent. It is believed that moisture content of less than one percent indicates the total absence of unbound free water. To minimize the time required for this treatment, the temperature should be in excess of approximately 200° F., preferably within the range of 200 to 300° F. Within this temperature range, toasting of dehydrated mashed potatoes containing 6 to 7 percent moisture is achieved within 4 hours time. Toasting may be conducted in an oven under atmospheric conditions or under a vacuum, the efficacy of the resulting product as regards improvement of flavor and texture in formed French fries being comparable when either method is used.

Dehydrated potato flakes are currently made by drying mashed potatoes in a thin film on a heated drum drier, the drying process usually being terminated by scraping the dry film from the drum when moisture content of the potatoes has been reduced to approximately 6 percent. Toasted flakes may be conveniently produced by allowing the drum drying operation to proceed beyond the point of 6 percent moisture. When toasted flakes are produced in this manner, the rate of rotation of the drum drier should be reduced to the point where the drying potato sheet has been reduced in moisture to less than 1 percent and a slightly brown color has developed as noted above by the time the sheet is scraped from the drum.

The expression "dehydrated mashed potatoes," as used herein, is hereby defined as any dried mashed potato product whether in the form of granules or flakes. Although potato flakes are preferred for use in extrudable dough for making French fries, granules may also be suitably used. In this connection, it should be noted that while starch breakdown is less of a problem in granules than in flakes, the flavor and odor of untreated granules detract from their use in formed fried products.

The esential ingredients of an extrudable French fry dough are dehydrated mashed potatoes, preferably in the flake form, and a sufficient amount of water to afford a moldable consistency. In general, depending on the properties of the starting material, such doughs comprise approximately 25 to 55 weight percent dehydrated mashed potato and 45 to 75 weight percent water. In terms of parts, this percentage range can be expressed as about 80 to 300 parts of water for each 100 parts of dehydrated mashed potato. It should be realized, of course, that the term "water" as used herein includes equivalents such as milks which comprise primarily water.

To be easily extrudable the dough must be cohesive. Cohesiveness can be attained by adding to the basic ingredients mentioned above, binder materials such as free starch or a soluble protein, such as egg albumen. Alternatively, and preferably, the requisite cohesiveness in the doughs of the present invention is attained by physically mixing the dough to such an extent that a portion of the starch cells of the dehydrated mashed potato contained therein are broken down, thereby providing free starch.

Potato flakes are altered by toasting to such an extent that breakdown of starch cells is difficult to produce by mere physical mixing. For this reason, when potato flakes are used in French fries produced in accordance with the present invention, it is preferred that at least a portion of the flakes be untoasted. The ratio of toasted to untoasted flakes may be varied to meet mixing capabilities; however, in order that maximum flavor and texture improvements noted above may be enjoyed, the percentage of toasted flakes should be as high as possible. This percentage should be above 50 percent by weight, more preferably above 90 percent, even though any amount of toasted flakes will enhance flavor and texture.

In addition to the components mentioned above, other ingredients may be added to improve keeping quality and color or to impart other flavors. Flavoring agents such as salt, cheese, onion and garlic may be easily incorporated in the dough. The use of a small amount of dextrose (i.e. up to 0.2 weight percent), improves the browning characteristics of the dough during frying. The use of dextrose will be illustrated in the examples below.

Dough formulated in accordance with the present invention may be used in a variety of ways. It may be formed by any technique (e.g. extrusion) and fried in hot oil immediately. The resulting product may be eaten immediately or it may be frozen and distributed to consumers who merely reheat the product before serving. As noted previously, potatoes made according to the invention reheat to a very crisp condition. Alternatively, the doughs may be formed and frozen without frying and distributed to the consumer in that state. In other variations, the formed food product may be pre-fried and frozen prior to distribution, or distributed without freezing or frying of any type.

Although dough produced according to the invention is primarily useful in producing a potato product similar in flavor and shape to conventional French fries, it should be apparent that products of other shapes and flavors may be easily formed.

In amplification of the above description of the invention, the following illustrative examples are offered:

*Example I*

50 pounds of dehydrated potato flakes containing about 7 weight percent moisture were placed in a steam-jacketed ribbon mixer supplied with 60 p.s.i.g. steam (308° F.). After 1¾ hours in the mixer at this temperature, the flakes began to change from their normal white color to a slightly brown color. After 10 to 15 minutes had elapsed, a light brown color had developed fully and the flakes were removed from the oven and allowed to cool. An analysis revealed that less than 1 percent moisture remained in the treated flakes.

*Example II*

A batch of dough containing 5220 grams of ordinary potato flakes, 8955 grams of water, 140 grams of salt and 14 grams dextrose was mixed until cohesive. The dough was extruded and cut into elongated pieces having the dimensions ⅜ inch by ⅜ inch by 2 inches. A second batch of dough containing 4410 grams of toasted flakes produced as described in Example I, 490 grams of ordinary potato flakes, 9275 grams of water, 140 grams salt and 14 grams dextrose, was extruded and cut into similar pieces. The pieces from each batch were fried separately in vegetable oil at 350° F. for 15 seconds. The resulting pre-fried potatoes were frozen and placed in storage. After two weeks in storage, samples were taken from each batch and fried in vegetable oil at 350° F. for approximately one minute. Upon visual examination, the fried potatoes made from toasted flakes had a more mealy, friable texture than did those produced from regular flakes. Samples from each batch were also eaten and in this test, the toasted flakes manifested a less pasty texture than did the product which contained no toasted flakes.

Although the invention has been described herein by means of specific illustrative examples, it is not intended that the invention be limited thereby. Rather, the invention should be limited only by the appended claims:

What is claimed is:

1. In a dough adapted for forming into a food product, said dough comprising dehydrated mashed potatoes and water in an amount sufficient to yield a formable dough, the improved dough in which at least 50 but less than 100 percent by weight of the dehydrated mashed potato is toasted.

2. The improved dough of claim 1 wherein at least 90 weight percent of the dehydrated mashed potato is toasted.

3. An edible food article suitable for frying and formed from a dough, the dough comprising 25 to 55 weight percent dehydrated potato flakes and 75 to 45 weight percent water, at least 50 but less than 100 percent by weight of said dehydrated potato flakes being toasted.

4. An edible food article suitable for frying and formed from a dough, the dough comprising 25 to 55 weight percent dehydrated potato flakes, 75 to 45 weight percent water and a small amount of dextrose, at least 50 but less than 100 percent by weight of said dehydrated potato flakes being toasted.

5. The food article of claim 4 wherein at least 90 weight percent of said dehydrated potato flakes are toasted.

6. A method of preparing a food product adapted for frying which comprises:
   (a) providing dehydrated mashed potatoes in flake form;
   (b) subjecting at least 50 but less than 100 percent by weight of said potato flakes to temperatures of at least 200° F. for a time sufficient to toast said flakes;
   (c) mixing all of said flakes with an amount of water and for a time sufficient to produce a formable cohesive dough; and
   (d) forming an article of food from said dough.

7. A method of preparing a food product adapted for frying which comprises:
   (a) providing dehydrated mashed potatoes in flake form;
   (b) subjecting at least 50 but less than 100 percent by weight of said flakes to temperatures between 200 and 300° F. for a time sufficient to produce a slightly brown color in said flakes;
(c) mixing all of said flakes with an amount of water and for a time sufficient to produce a formable cohesive dough; and
(d) forming an article of food from said dough.

8. A method of preparing a food product adapted for frying which comprises:
(a) providing 100 parts by weight of dehydrated mashed potatoes in flake form;
(b) subjecting at least 50 but less than 100 percent by weight of said flakes to temperatures between 200 and 300° F. for a time sufficient to produce a slightly brown color in said flakes;
(c) mixing all of said flakes with 80 to 300 parts by weight of water for a time sufficient to produce a cohesive dough; and
(d) forming an article of food from said dough.

9. A method of preparing a fried food product adapted for reheating to a crisp condition, which comprises:
(a) providing 100 parts by weight of dehydrated mashed potatoes in flake form;
(b) subjecting at least 50 but less than 100 percent by weight of said flakes to temperatures between 200 and 300° F. for a time sufficient to produce a slightly brown color in said flakes;
(c) mixing all of said flakes with 190 parts by weight of water for a time sufficient to produce a cohesive dough;
(d) forming an article of food from said dough;
(e) frying said formed food article; and
(f) freezing said food article.

10. A method of preparing a food product adapted for frying which comprises:
(a) providing 100 parts by weight of dehydrated mashed potatoes in flake form;
(b) subjecting at least 50 weight percent but less than 100 percent of said flakes to temperatures between 200° and 300° F. for a time sufficient to produce a slightly brown color in said flakes;
(c) mixing all of said flakes with 190 parts by weight of water for a time sufficient to produce a cohesive dough;
(d) forming an article of food from said dough;
(e) frying said formed food article; and,
(f) freezing said fried article of food.

References Cited by the Examiner

UNITED STATES PATENTS

| | | | |
|---|---|---|---|
| 2,401,392 | 6/1946 | Ware et al. | 99—100 |
| 2,520,891 | 8/1950 | Rivoche | 99—207 |
| 3,027,258 | 3/1962 | Markakis et al. | 99—207 |
| 3,027,264 | 3/1962 | Irmiter et al. | 99—207 |
| 3,063,848 | 11/1962 | Van Gelder | 99—204 |
| 3,063,849 | 11/1962 | Nelson et al. | 99—207 |
| 3,067,042 | 12/1962 | Pader | 99—207 |
| 3,085,019 | 4/1963 | Kueneman et al. | 99—207 |

FOREIGN PATENTS 491,889    4/1953    Canada.

A. LOUIS MONACELL, *Primary Examiner.*

HYMAN LORD, S. J. BAICKER, J. M. GOLIAN,
*Assistant Examiners.*